United States Patent [19]

Isono et al.

[11] Patent Number: 5,892,150
[45] Date of Patent: Apr. 6, 1999

[54] AIR FLOW MEASURING ELEMENT AND AIR FLOW MEASURING APPARATUS THEREWITH

[75] Inventors: Tadashi Isono, Mito; Izumi Watanabe; Akira Takasago, both of Hitachinaka, all of Japan

[73] Assignees: Hitachi, Ltd.; Hitachi Car Engineering Co., Ltd., both of Japan

[21] Appl. No.: 5,830

[22] Filed: Jan. 12, 1998

[30] Foreign Application Priority Data

Jan. 10, 1997 [JP] Japan ................................ 9-002633

[51] Int. Cl.⁶ .................................................. G01F 1/68
[52] U.S. Cl. ............................................... 73/204.26
[58] Field of Search .......................... 73/204.26, 204.15, 73/204.27

[56] References Cited

U.S. PATENT DOCUMENTS 5,237,867  8/1993  Cook, Jr. ............................ 73/204.26

FOREIGN PATENT DOCUMENTS 1-185416  of 1989  Japan .

*Primary Examiner*—Harshad Patel
*Attorney, Agent, or Firm*—Evenson, McKeown, Edwards & Lenahan P.L.L.C.

[57] ABSTRACT

A measuring element for an air flow rate measuring apparatus has upstream and downstream heating resistors and first and second temperature compensating resistors paired with the upstream and downstream heating resistors, respectively. The resistors are mounted on an electrically insulated substrate positioned within an air flow. A substantial part of resistor film of the temperature compensating resistor paired with the upstream heating resistor is positioned upstream on the insulated substrate relative to the resistor film of the compensating resistor paired with the downstream heating resistor.

7 Claims, 7 Drawing Sheets

AIR FLOW MEASURING ELEMENT AND AIR FLOW MEASURING APPARATUS THEREWITH

BACKGROUND OF THE INVENTION

The present invention relates to an air flow rate measuring apparatus and, more particularly, to an apparatus suitable for the measurement of an amount of the air flow taken into an engine.

Japanese Patent Application Laid-Open No. 1-185416 (1990) discloses an air flow rate measuring apparatus, in which a measuring element has two heating resistors and two temperature sensing resistors arranged in parallel with a direction of an air flow.

In the prior art, the upstream and the downstream heating resistors, and the upstream and the downstream temperature sensing resistors have the same resistance parameter, and each resistor is provided in parallel with the direction of the air flow to be able to measure a reverse air flow. However, the accuracy of measurement is deteriorated when there is a large difference between the temperature of the air flow rate measuring apparatus and that of the intake air.

That is, since an output signal of the air flow rate measuring apparatus is obtained by performing constant temperature control by means of an operating circuit, with regard to the surface temperature of the heating resistor and the temperature of the intake air detected by the temperature sensing resistor, it is necessary that the temperature sensing resistor can detect the temperature of the intake air independently of the temperature of the air flow rate measuring apparatus, even when there is a large difference between the temperature of the air flow rate measuring apparatus and that of the intake air.

However, when an engine is warmed up in a garage in which the ambient temperature is relatively high, in winter or in a cold area, as the temperature of the engine increases, that of the air flow rate measuring apparatus also increases. Thereafter, when the car is operated outside, where the ambient temperature is low, the temperature sensing resistor erroneously detects a temperature higher than the actual temperature, due to the effect of thermal conduction from the air flow rate measuring apparatus which is at a high temperature. There is, therefore, a concern that the air flow rate measuring apparatus may provide an output value higher than the value indicative of the actual air flow rate.

SUMMARY OF THE INVENTION

An object of the present invention is to provide a measuring element for an air flow rate measuring apparatus (and an air flow rate measuring apparatus provided therewith) which can accurately measure an air flow, even when there is a large difference between the temperature of the measuring apparatus and that of the intake air.

To attain the above-mentioned object, the present invention preferably has the following configuration.

According to a first aspect of the present invention, a measuring element for an air flow rate measuring apparatus includes upstream and downstream heating resistors, and two temperature compensating resistors one for each of the heating resistors, mounted on an electrically insulated substrate positioned within an air flow. A resistor film of the temperature compensating resistor paired with the upstream heating resistor is overlapped with a resistor film of the temperature compensating resistor paired with the downstream heating resistor. Furthermore, a large part of the resistor film of the temperature compensating resistor paired with the upstream heating resistor is positioned upstream of the insulated substrate in comparison with the resistor film of the compensating resistor paired with the downstream heating resistor.

Preferably, the resistor film of the temperature compensating resistor paired with the upstream heating resistor and the resistor film of the compensating resistor paired with the downstream heating resistor are formed in double spirals on the same substrate.

According to a second aspect of the present invention, a measuring element for an air flow rate measuring apparatus includes upstream and downstream heating resistors, and two temperature compensating resistors, one for each of the heating resistors, mounted on an electrically insulated substrate positioned within an air flow and supported by a cantilever. A resistor film of the temperature compensating resistor paired with the upstream heating resistor is overlapped with a resistor film of the temperature compensating resistor paired with the downstream heating resistor. Furthermore, a large part of the resistor film of the temperature compensating resistor paired with the upstream heating resistor is positioned upstream of the insulated substrate in comparison with the resistor film of the compensating resistor paired with the downstream heating resistor.

According to a third aspect of the present invention, a measuring element for an air flow rate measuring apparatus includes upstream and downstream heating resistors and two temperature compensating resistors, one for each of the heating resistors, mounted on an electrically insulated substrate positioned within an air flow and supported by a cantilever. At least one of a resistor film of the temperature compensating resistor paired with the upstream heating resistor is positioned at a free end of the substrate, and upstream of the insulated substrate relative to the resistor film of the compensating resistor paired with the downstream heating resistor.

According to another aspect of the present invention, an air flow rate measuring apparatus for measuring an amount of air flow including a reverse flow is provided, which comprises a measuring element including upstream and downstream heating resistors and two temperature compensating resistors, one for each of the heating resistors, mounted on an electrically insulated substrate positioned with in an air flow. An operating circuit includes a circuit for performing constant temperature-difference-control, independently by each of two pairs of the heating resistors and the temperature compensating resistors, and for comparing the magnitude of outputs of the two heating resistors. The measuring element is constructed as above.

These and other features of the invention that will be apparent to those skilled in the art from the following detailed description of the invention, taken together with the accompanying drawings.

BRIEF DESCRIPTION OF THE DRAWINGS

Corresponding numerals and symbols in different figures refer to corresponding parts unless otherwise specified.

PREFERRED EMBODIMENTS OF THE INVENTION

Preferred embodiments of the present invention will be explained with reference to the drawings.

Figures 1A, 1B:
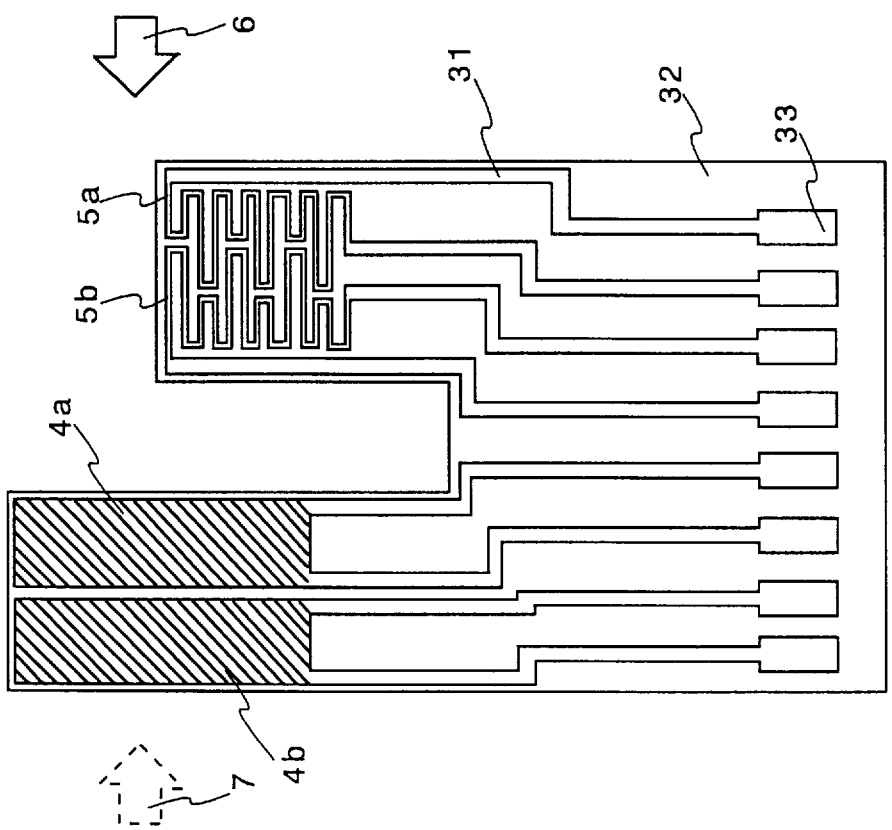
FIG. 1A is a front view of a measuring element for the air flow rate measuring apparatus according to a first embodiment of the present invention.
FIG. 1B is a partially enlarged view of a measuring element for the air flow rate measuring apparatus according to a first embodiment of the present invention.
Figure 2:
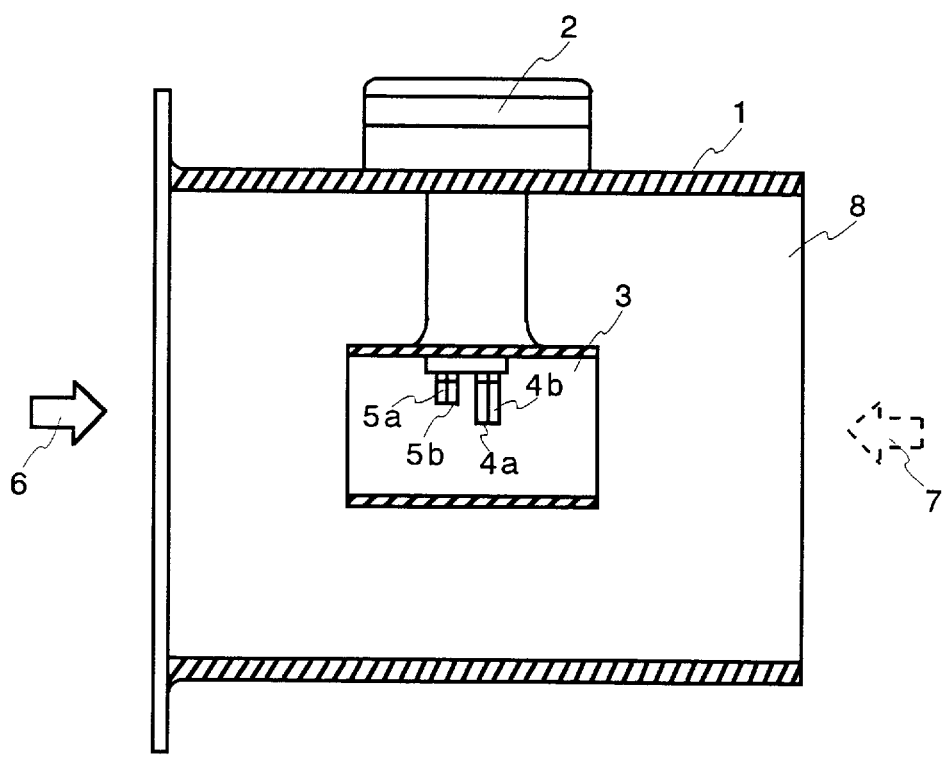
FIG. 2 is a sectional view of an air flow rate measuring apparatus which uses the measuring element of FIG. 1.
Figure 3:
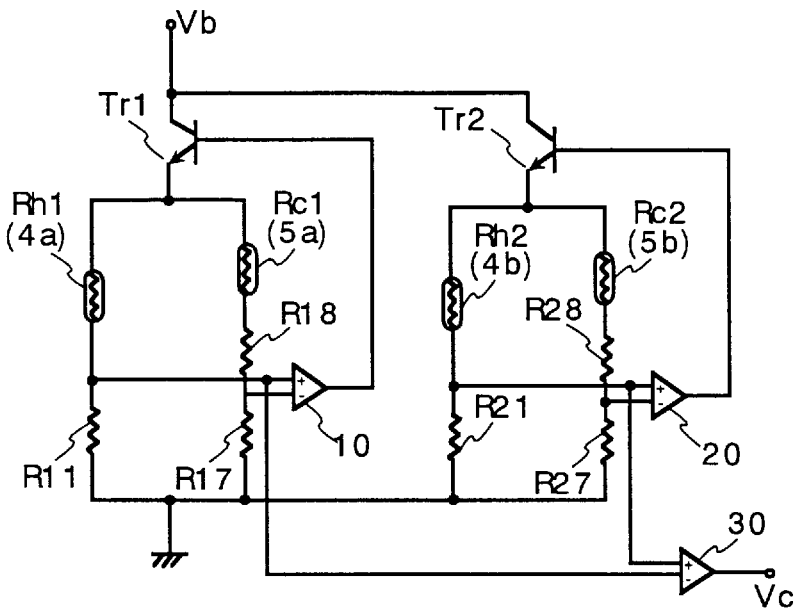
FIG. 3 is a circuit diagram showing an operating circuit for the air flow rate measuring apparatus.

FIG. 1A is a front view of a measuring element for the air flow rate measuring apparatus according to a first embodiment of the present invention, and FIG. 1B is a partially enlarged view of the same measuring element. FIG. 2 is a sectional view of an air flow rate measuring apparatus which uses the measuring element of FIG. 1A. Further, FIG. 3 is a circuit diagram showing an operating circuit for the air flow rate measuring apparatus.

The measuring element shown in FIG. 1A comprises upstream and downstream resistors 4a, 4b, a forward flow temperature sensing resistor 5a paired with the upstream heating resistor 4a, and a reverse flow temperature sensing resistor 5b paired with the downstream heating resistor 4b, formed on a substrate 32 or electrically insulated body, for example, made by almina. The resistor films of the resistors are formed by evaporating a material such as platinum, and patterning the result by etching, with a resistance temperature coefficient being taken into consideration. Further, a conductor 31 and an electrode 33 for electrically connecting each resistor pattern to a control module 2 are formed by printing a material such as silver-platinum. FIG. 1b shows enlarged resistor patterns of the resistors 5a and 5b.

In FIG. 2, air flow to an engine passes through a main passage 8 and a sub-passage 3 provided in a body 1 of the air flow rate measuring apparatus, for measuring an amount of intake air. If the engine load is high and the engine speed is low, the intake air may include a pulsating flow, so that both a forward flow 6 and a reverse flow 7 alternately pass through the main passage 8 and the sub-passage 3. In this case, in order to determine whether a forward or reverse flow passes, and to measure correctly the amount of air flow, the measuring element according to the present embodiment is provided with the upstream and the downstream resistors 4a, 4b, the forward flow temperature sensing resistor 5a paired with the upstream heating resistor 4a, and the reverse flow temperature sensing resistor 5b paired with the downstream heating resistor 4b.

Further, the control module 2 for outputting a signal detected by the measuring element as an electric signal corresponding to an amount of the air flow is mounted on the outer surface of the body 1. The control module 2 includes a basic operating circuit as shown in FIG. 3. In the measuring element of this embodiment, the upstream heating resistor 4a and the temperature sensing resistor 5a, and the downstream heating resistor 4b and the temperature sensing resistor 5b, respectively, constitute independent bridge circuits, in which the heating resistors 4a and 4b are feedback-controlled so as to maintain a predetermined temperature difference relative to the temperature of intake air. Further, the determination of the forward flow or the reverse flow is performed by a comparator 30 in which the magnitude of voltages obtained from the upstream resistor 4a and the downstream resistors 4b are compared with each other.

As described above, the output signal of the air flow rate measuring apparatus is obtained by controlling the heating resistors by the operating circuit so as to produce a predetermined difference in temperature between the surface temperature of the heating resistor and the temperature of the intake air detected by the temperature sensing resistor. It is, therefore, necessary that the temperature sensing resistor can detect the temperature of intake air without impact of the air flow rate measuring apparatus, even when there is a large difference between the temperature of the intake air and that of the air flow rate measuring apparatus.

However, when the temperature of the air flow rate measuring apparatus has increased, the temperature sensing resistor detects a temperature which is higher than the actual temperature, due to thermal conduction from the air flow rate measuring apparatus to the measuring element. Therefore, there is a concern that the air flow rate measuring apparatus may output an air flow rate value which is higher than the actual air flow rate. (This phenomenon is referred to hereinafter as a "temperature characteristic").

In order to solve this problem, it is desirable that the temperature sensing resistor has a configuration which is not susceptible to the influence of thermal conduction from the air flow rate measuring apparatus.

Since a reverse flow 7 occurs only under limited conditions, a main output signal of the air flow rate measuring apparatus is obtained from the upstream heating resistor 4a for measuring an amount of the forward flow 6. It is therefore important that the forward flow temperature sensing resistor 5a paired with the upstream heating resistor has a configuration which is not susceptible to the influence of thermal conduction from the air flow rate measuring apparatus.

Figure 4:
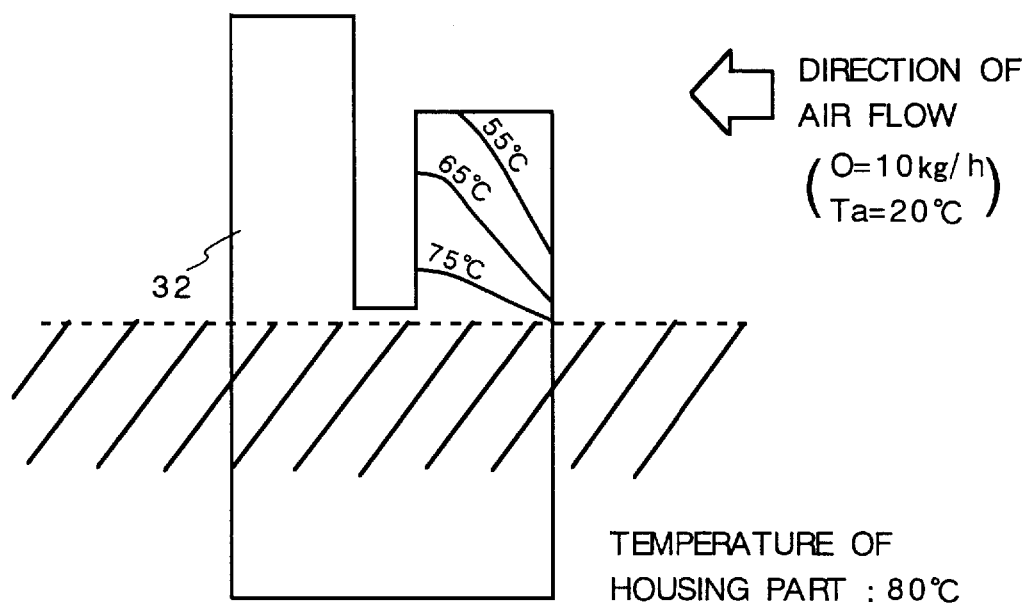
FIG. 4 is a diagram showing the surface temperature obtained when a housing member of the measuring element shown in FIG. 1 is heated.

FIG. 4 shows the surface temperature where the temperature sensing resistors are formed, assuming that the housing member to which the measuring element is fixed is heated to 80° C., that the temperature of the air flow is 20° C., and that the flow rate is 10 kg/h. As seen from the figure, the surface temperature of the substrate is lower at the upstream side (relative to the air flow direction) of the substrate 32, which is susceptible to the cooling of the air flow, and in a direction perpendicular to the air flow, it becomes lower approaching the free end, far from the housing member (in this case, a heat source). Accordingly, it is seen that the locations where the temperature sensing resistors 5a and 5b are formed have a significant impact on the temperature characteristic of the air flow rate measuring apparatus.

The results of experiments on the above-mentioned temperature characteristics will be explained with reference to FIGS. 5A through 5E and FIG. 6.

Figures 5A, 5B, 5C:
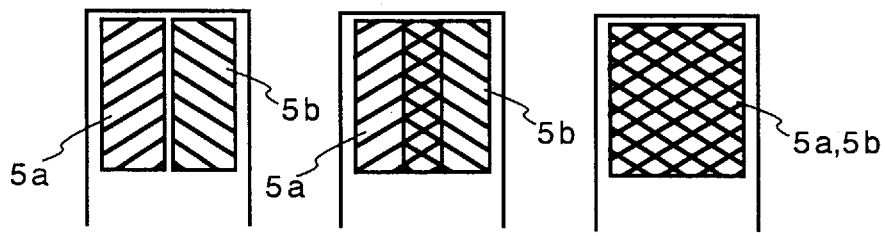
FIGS. 5A through 5E are views showing various resistance patterns of the measuring element shown in FIG. 1.
Figures 5D, 5E:
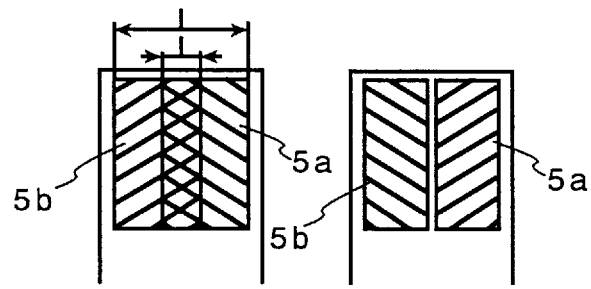
Figure 6:
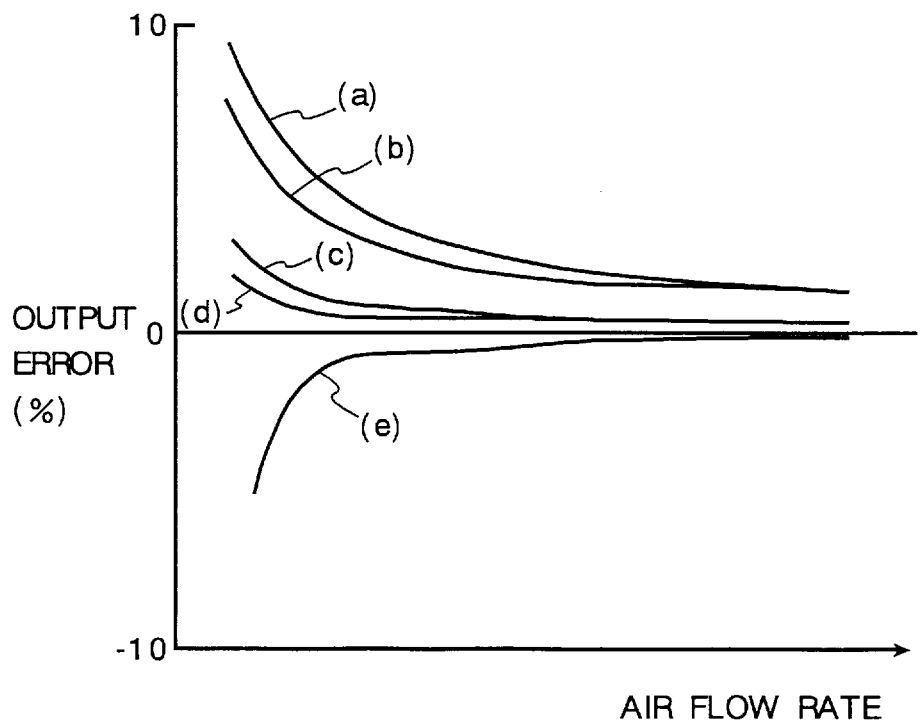
FIG. 6 is a graph showing a temperature characteristic obtained by the resistance patterns shown in FIGS. 5A through 5E.

FIGS. 5A through 5E show the extent of the overlapping of the temperature sensing resistors 5a and 5b (as illustrated in FIGS. 1A and 1B), and FIG. 6 shows the relationship between the output error and the air flow rate, with regard to each of the configurations of FIGS. 5A through 5E. In FIG. 6, (a) designates the temperature characteristic of the configuration of FIG. 5A, (b) that of FIG. 5B, (c) that of FIG. 5C, (d) that of FIG. 5D, (e) that of FIG. 5E. The experiment was carried out with the temperature of intake air at ordinary temperatures, and the air flow rate measuring apparatus heated to 80° C.

In FIG. 5A, the temperature sensing resistor 5b for a reverse flow is arranged in parallel with the forward flow temperature sensing resistor 5a at the upstream side, relative to the direction of air flow. In FIG. 5B, the temperature sensing resistors 5a and 5b overlap each other at their central portion of the substrate 32, and the reverse flow temperature sensing resistor 5b is still positioned at the upstream side, relative to the air flow. In these cases, since the temperature sensing resistor 5a for a forward flow is positioned in a place susceptible to the thermal effect, a large output error occurs.

In FIG. 5C, the temperature sensing resistor 5a for a forward flow and the temperature sensing resistor 5b for a reverse flow are overlaid completely on the substrate in the direction of air flow. Because approximately half the temperature sensing resister 5a can be positioned at the upstream side of the substrate 32, it is possible to lessen significantly the output error due to the temperature characteristic.

Further, in FIG. 5D, the temperature sensing resistors 5a and 5b are overlapped with each other at the central portion of the substrate 32, and the forward flow temperature sensing resistor 5a is positioned at the upstream side relative to the direction of air flow. This measuring element is a first embodiment of the present invention. As shown in FIG. 6, it is possible substantially to decrease the output error due to the temperature characteristic, by using this resistance pattern. Further, as confirmed by experiment, it is possible to decrease the output error due to the temperature characteristic to a value less than 3%, by setting the overlapping ratio (the ratio of the area of the overlapped portion to the area of the portions where the temperature sensing resistors are formed) of the forward flow temperature sensing resistor 5a and the reverse flow temperature sensing resistor 5b to a value of more than 40%.

However, if the temperature sensing resistor 5a for a forward flow is provided in parallel with the temperature sensing resistor 5b for a reverse flow, but is positioned at the upstream side relative to the direction of air flow (FIG. 5E), the temperature sensing resistor 5b is extremely susceptible to the thermal effects, and thus the heating temperature of the downstream heating resistor also increases substantially. On the contrary, since the heating temperature of the upstream heating resistor 4a is almost constant, temperature difference occurs between both heating resistors. Therefore, heat is transferred from the downstream heating resistor 4b (which is at a high temperature) to the upstream heating resistor 4a (at a low temperature), due to thermal conduction. A current for heating the upstream heating resistor 4a becomes less than the heating current necessary at ordinary temperatures. As a result, the temperature characteristic of the air flow rate measuring apparatus swings largely to the minus side.

From the above results, it is seen that the following configurations are better in the temperature characteristic than other configurations.

(1) The temperature sensing resistors 5a and 5b are overlapped each other at the central portion of the substrate 32, and the temperature sensing resistor 5a for a forward flow is positioned at the upstream side relative to the direction of air flow (the measuring element according to a first embodiment of the present invention).

Figure 7:
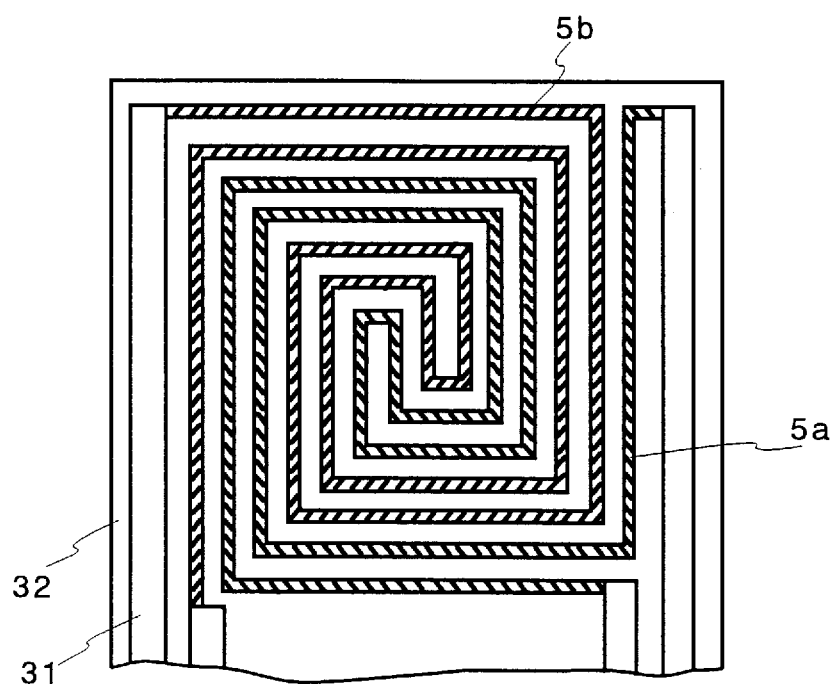
FIG. 7 is a partially enlarged view of a measuring element for the air flow rate measuring apparatus according to a second embodiment of the present invention.

(2) The forward flow temperature sensing resistor 5a and the reverse flow temperature sensing resistor 5b are overlaid completely on the substrate and relative to the direction of air flow. Accordingly, in a second embodiment of the present invention, the forward flow temperature sensing resistor 5a and the reverse flow temperature sensing resistor 5b are overlaid completely on the substrate and in a direction of air flow, and the measuring element preferably has temperature sensing resistors 5a and 5b which are formed like double spirals on the substrate 32, as shown in FIG. 7. This configuration provides a measuring element for an air flow rate measuring apparatus having a favorable temperature characteristic.

Figure 8:
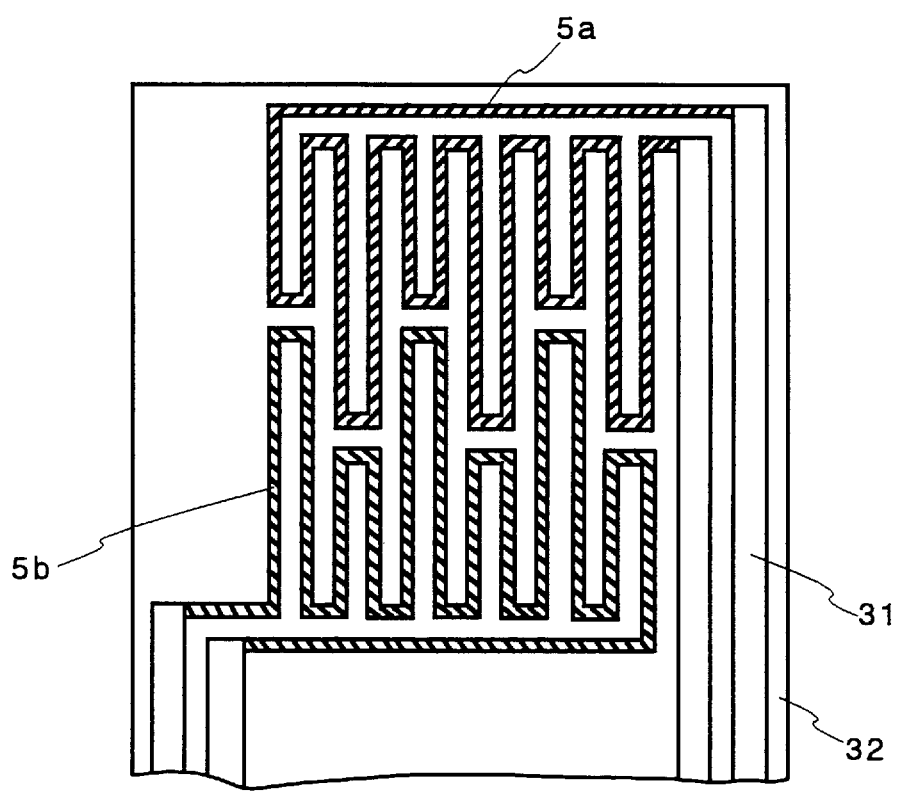
FIG. 8 is a partially enlarged view of a measuring element for the air flow rate measuring apparatus according to a third embodiment of the present invention.

Further, as a third embodiment of the present invention, the forward flow temperature sensing resistor 5a can be arranged at the free end of the substrate 32, which is not susceptible to the thermal effect, as shown in FIG. 8. This configuration also provides a measuring element for an air flow rate measuring apparatus having a favorable temperature characteristic.

Figure 9:
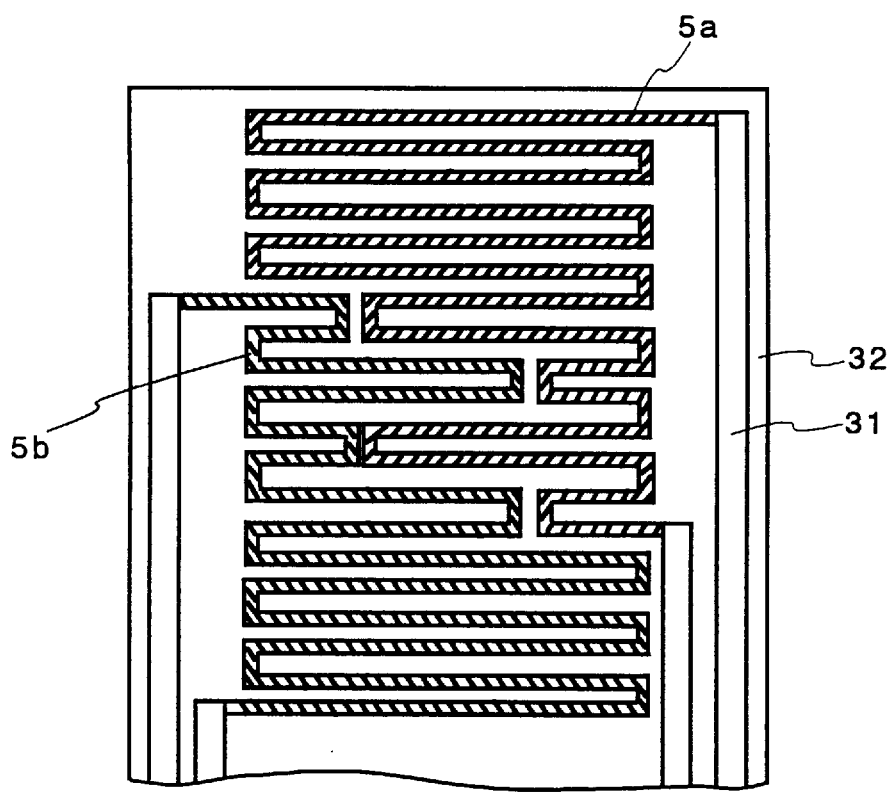
FIG. 9 is a partially enlarged view of a measuring element for the air flow rate measuring apparatus according to a fourth embodiment of the present invention.

Further, as a fourth embodiment of the present invention, the forward flow temperature sensing resistor 5a can be arranged at the free end of the substrate 32 and at the upstream side of the substrate 32, which is not susceptible to the thermal effect, as shown in FIG. 9. This configuration also provides a measuring element for an air flow rate measuring apparatus having a favorable temperature characteristic.

An improved air flow rate measuring apparatus in which the output error due to the temperature characteristic is reduced, can be obtained by applying any one of the measuring elements according to the first to the fourth embodiments to an air flow rate measuring apparatus for a vehicle. That is, even if the temperature in an engine room is increased, it is possible to measure correctly the temperature of intake air, independently of the temperature of the air flow rate measuring apparatus. As a result, the normal engine speed can be maintained even in an environment in which the temperature of the air flow rate measuring apparatus and that of air are apt to differ, such as in winter time.

While this invention has been described with reference to illustrative embodiments, this description is not intended to be construed in a limiting sense. Various modifications and combinations of the illustrative embodiments as well as other embodiments of the invention, will be apparent to those of skill in the art upon reference to the description. It is,therefore, intended that the appended claims encompass any such modifications or embodiments.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A measuring element for an air flow rate measuring apparatus comprising:

an upstream heating resistor;

a downstream heating resistor; and first and second temperature compensating resistors mounted on an electrically insulated substrate positioned within an air flow, said first temperature compensating resistor being paired with said upstream heating resistor, and said second temperature compensating resistor being paired with said downstream heating resistor;

wherein a resistor film of the first temperature compensating resistor is overlapped with a resistor film of the second temperature compensating resistor; and wherein a substantial part of resistor film of the first temperature compensating resistor is positioned on the insulated substrate upstream of the resistor film of the second compensating resistor.

2. A measuring element for an air flow rate measuring apparatus according to claim 1, wherein the resistor film of the first temperature compensating resistor and the resistor film of the second compensating resistor are formed in double spirals on a single substrate.

3. A measuring element for an air flow rate measuring apparatus according to claim 1, wherein said electrically insulated substrate is supported on a cantilever.

4. A measuring element for an air flow rate measuring apparatus comprising:

an upstream heating resistor;

a downstream heating resistor; and first and second temperature compensating resistors mounted on an electrically insulated substrate positioned within an air flow and supported by a cantilever, said first temperature compensating resistor being paired with said upstream heating resistor, and said second temperature compensating resistor being paired with said downstream heating resistor;

wherein at least a resistor film of the first temperature compensating resistor is positioned at a free end of the insulated substrate, and upstream, relative to a direction of said air flow, of the resistor film of the second temperature compensating resistor.

5. An air flow rate measuring apparatus for measuring an air flow, including a reverse air flow, comprising:

a measuring element having upstream and downstream heating resistors, and first and second temperature compensating resistors mounted on an electrically insulated substrate positioned within an air flow, said first temperature compensating resistor being paired with said upstream heating resistor, and said second temperature compensating resistor being paired with said downstream heating resistor; and an operating circuit including a circuit for performing constant temperature-difference-control, independently by means of each of the two pairs of heating and temperature compensating resistors, and comparing a magnitude of outputs of said two heating resistors;

wherein a resistor film of the first temperature compensating resistor is overlapped with a resistor film of the second temperature compensating resistor; and wherein a substantial part of resistor film of the first temperature compensating resistor is positioned on the insulated substrate upstream of the resistor film of the second compensating resistor.

6. An air flow rate measuring apparatus according to claim 5 wherein said electrically insulated substrate is supported on a cantilever.

7. An air flow rate measuring apparatus for measuring an air flow, including a reverse flow, comprising:

a measuring element having upstream and downstream heating resistors and first and second temperature compensating resistors mounted on an electrically insulated substrate positioned within an air flow and supported by a cantilever, said first temperature compensating resistor being paired with said upstream heating resistor, and said second temperature compensating resistor being paired with said downstream heating resistor; and an operating circuit including a circuit for performing constant temperature-difference-control, independently by means of each of the two pairs of heating and temperature compensating resistors, and comparing a magnitude of outputs of said two heating resistors with each other;

wherein at least a resistor film of the first temperature compensating resistor is positioned at a free end of the insulated substrate, and upstream, relative to a direction of said air flow, of the resistor film of the second compensating resistor.

* * * * *